United States Patent

Protas

[15] 3,677,494

[45] July 18, 1972

[54] TAPE CARTRIDGE CONSTRUCTION

[72] Inventor: Arthur I. Protas, Cupertino, Calif.

[73] Assignee: Cartridge Television, Inc., New York, N.Y.

[22] Filed: Dec. 8, 1969

[21] Appl. No.: 883,084

[52] U.S. Cl. ....................242/194, 352/156

[51] Int. Cl. ....................G03b 1/04, G11b 15/32

[58] Field of Search ....................242/194, 197–200, 242/188–201; 352/72, 78, 156; 74/330

[56] References Cited

UNITED STATES PATENTS

| | | | |
|---|---|---|---|
| 3,484,056 | 12/1969 | Sugino et al. | 242/193 |
| 3,105,645 | 10/1963 | Rost | 242/191 |
| 3,197,150 | 7/1965 | Camras | 242/195 X |

*Primary Examiner*—Leonard D. Christian
*Attorney*—Townsend and Townsend

[57] ABSTRACT

A reel-over-reel tape cartridge having a pair of axially aligned tape hubs and improved means for mounting the hubs for rotation independently of each other within a cartridge housing. One hub has a tubular extension permitting it to be rotatably mounted on one wall member of the housing and the other hub has an extension and a tubular body to permit it to be rotatably mounted on the one hub and on a second wall member of the cartridge housing. The hubs are formed to permit a rotatable drive member to be alternately coupled thereto to cause rotation thereof in the same direction to avoid the need for a reversible drive means for the hubs. The cartridge can be provided with a removable reel having a tape which mates with a tape leader attached to a rotatable hub in the cartridge for receiving the tape of the removable reel. The removable reel feature can also be used with a cartridge having the reels side by side with each other.

2 Claims, 21 Drawing Figures

Patented July 18, 1972 3,677,494

2 Sheets-Sheet 1

INVENTOR.
ARTHUR I. PROTAS

BY Townsend and Townsend

ATTORNEYS

INVENTOR.
ARTHUR I. PROTAS
BY Townsend and Townsend
ATTORNEYS

TAPE CARTRIDGE CONSTRUCTION

The invention relates to improvements in tape cartridges and, more particularly, to a tape cartridge of the reel-over-reel type.

In a conventional reel-over-reel tape cartridge, the hubs or reels within the cartridge, being in axial alignment with each other and necessarily being rotatable independently of each other, generally require a complicated mounting structure to achieve these ends. Such structure increases the costs of the cartridge and gives rise to frequent malfunctions which require that the mounting be repaired or otherwise modified to assure continued operation thereafter. Moreover, the means for independently driving the hubs is also quite complex and this aspect adds to the overall problems of keeping the cartridge in operating condition. Thus, a need exists for a simplified mounting for the hubs of a reel-over-reel cartridge wherein such a mount can be used with drive means having a rotatable drive shaft which rotates in only a single direction to avoid the need for a reversible power means.

The present invention satisfies the above need by providing a reel-over-reel tape cartridge which has a simplified mounting means for the axially disposed hubs thereof yet permits a rotatable drive shaft to be coupled to alternate ones of the hubs so that the drive is in the same direction for record playback operations and rewind operations.

Thus, the cartridge of this invention can be made at minimum costs and will operate for extended periods of time without malfunction. Also, the way in which the hubs are mounted permits a drive shaft to be used which rotates in only one direction so as to eliminate the need for a reversible power device.

Another aspect of the invention is the use of a removable reel in a tape cartridge, including a reel-over-reel cartridge and a reel-beside-reel cartridge. The removability of one of the two reels of a cartridge permits the latter to be more versatile in use inasmuch as the removable reel can be subjected to a recording process wherein signals are recorded on its tape in another cartridge or in another mounting of some type, following which the reel can then be inserted in the cartridge of this invention and played back and rewound in the same manner as if the removable reel were a permanent part of the cartridge itself.

A number of advantages accrue from the use of this feature including the use of the removable reel for recording televised conferences as well as usual storage of the removable reels while permitting the cartridge itself to be used for playback of other removable reels. Other advantages of this feature include the use of the cartridge and the removable reel for recording signals on the tape of the removable reel, whereby the latter can be used elsewhere in another cartridge or in a tape transport unit adapted for its use.

The primary object of this invention is to provide improvements in the mounting of the hubs of a reel-over-reel tape cartridge wherein the cartridge can be simplified in construction to reduce its production costs and to minimize malfunctions which oftentimes occur with conventional tape cartridges of this type.

Another object of this invention is to provide an improved tape cartridge of the type described wherein the hub mounting means permits a rotatable drive shaft to be alternately coupled to the hubs with the shaft being rotatable in the same direction for both record playback operations and rewind operations to thereby eliminate the need for a reversible power means.

A further object of this invention is to provide an improved tape cartridge having a pair of reels disposed to receive a flexible magnetic tape therebetween wherein one of the reels is removable with respect to the other reel to permit the removable reel to be recorded or played back at a location remote from the other reel.

Still another object of this invention is to provide a tape cartridge having a removable reel wherein the cartridge can be either of the reel-over-reel type or of the reel-beside-reel type and wherein the cartridge is provided with means for receiving the end of the tape and the removable reel to ultimately couple the tape to a tape leader forming a permanent part of the cartridge so that a record or playback operation can commence as soon as the removable reel is played in the cartridge.

Other objects of this invention will become apparent as the following specification progresses, reference being had to the accompanying drawings for illustrations of several embodiments of the invention.

IN THE DRAWINGS

Figure 1:
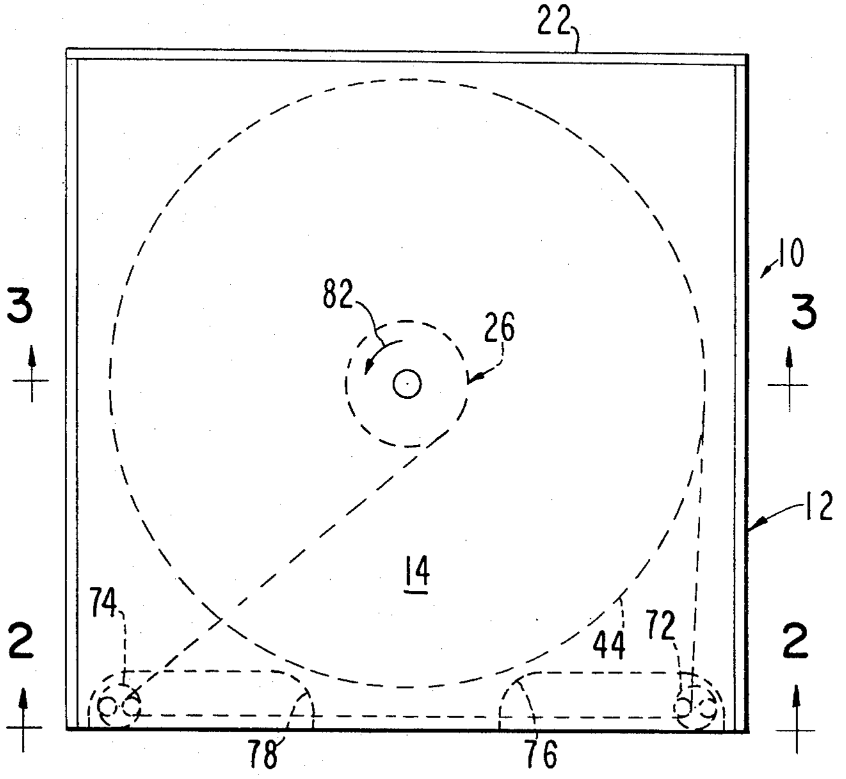
FIG. 1 is a top plan view of a reel-over-reel cartridge forming one embodiment of this invention.
Figure 2:
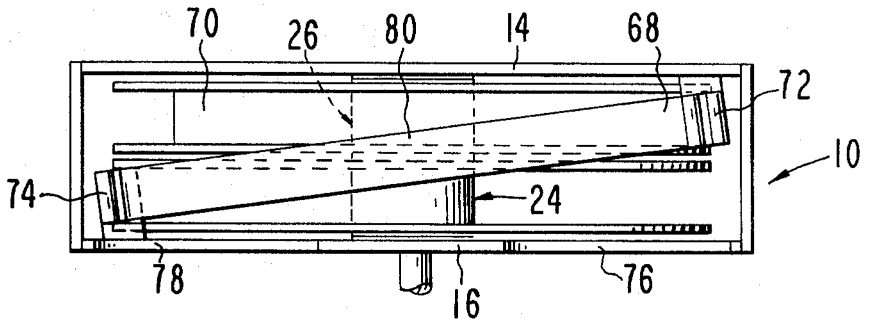
FIG. 2 is an end elevational view of the cartridge of FIG. 1 looking in the direction of line 2—2 of FIG. 1.
Figure 3:
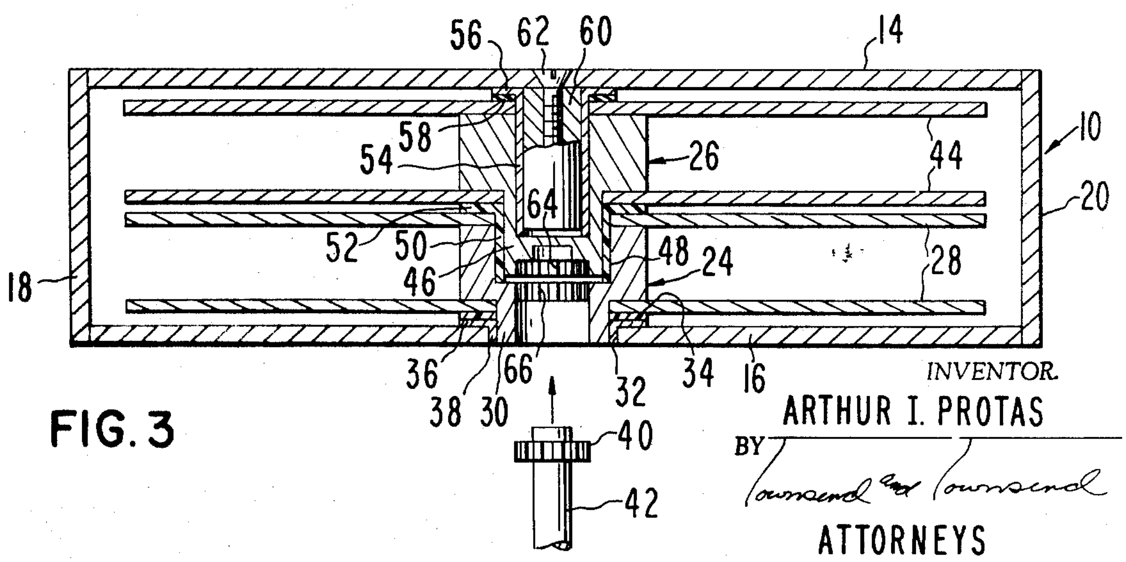
FIG. 3 is an enlarged, cross-sectional view taken along line 3—3 of FIG. 1.

The first embodiment of the cartridge of this invention is broadly denoted by the numeral 10 and is illustrated in FIGS. 1–3. Cartridge 10 is of the reel-over-reel type and includes a cartridge housing 12 having a pair of opposed wall members 14 and 16, as illustrated, which are generally parallel with each other and are interconnected by a pair of sides 18 and 20 and an end 22. The end opposite to end 22 is open for purposes hereinafter described.

Cartridge 10 houses a pair of axially aligned tubular tape hubs 24 and 26 mounted for rotation about a common axis independently of each other. Hub 24 has a pair of annular flanges 28 extending outwardly therefrom for facilitating the formation of a tape pack on the hub when a flexible magnetic tape is wound thereon. Hub 24 is formed with an integral reduced extension 30 which passes into and through an opening 32 in wall member 16 as shown in FIG. 3. Flange 28 adjacent to wall members 16 is supported for rotation on a felt washer 34 which, in turn, is supported on the flange 36 of an anti-friction bushing 38 made from any suitable material, such as fluorocarbon or the like. In this way, hub 24 is mounted for rotation relative to flange 36 and washer 34 on wall member 16 which defines a base for hub 24.

The inner surface of extension 30 is splined for receiving a gear-like drive member 40 on the end of a reciprocal shaft 42 when the cartridge is properly aligned with respect to drive member 40. Shaft 42 forms a part of a tape transport unit (not shown) with which cartridge 10 is to be used.

A pair of opposed flanges 44 are mounted on hub 26 for rotation with the hub and between which a tape is disposed in a pack when the tape is wrapped on the hub. Hub 26 is formed into an integral reduced axial extension 46 which is received within a central well 48 formed in hub 24. An anti-friction bushing 50 of suitable material, such as fluorocarbon or the like, is disposed in well 48 exteriorly of and removably carried by extension 46, whereby the latter and thereby hub 26 can rotate freely relative to hub 24. Flange 52 on bushing 50 supports hub 26 on hub 24 for rotation relative thereto.

A flanged, anti-friction bushing 54 is removably received within a central bore formed in hub 26, bushing 54 being of a suitable material, such as fluorocarbon or the like, and having a flange 56 supported on a felt washer 58 in engagement with the upper flange 44 (FIG. 3). A stub shaft 60 is received within bushing 54 and is rigidly secured by a screw 62 to wall member 14. Thus, hub 26 is rotatably supported at one end by hub 24 and at its other end by stub shaft 60.

Extension 46 of hub 26 is provided with a two-stepped countersink 64 which is in axial alignment and communicates with a central bore 66 through extension 30 of hub 24. The inner surface of the larger diameter countersink portion of recess 64 is splined to permit hub 24 to become coupled with drive member 40 of shaft 42 when the drive member is received within the recess. The smaller diameter countersink portion permits the end of shaft 42 to enter recess 64 sufficiently to permit member 40 to engage the splined surface.

Cartridge 10 is adapted to hold an elongated, flexible magnetic tape 68 with the tape being coupled to hubs 24 and 26 and adapted to be wrapped thereon and unwrapped therefrom. A stretch of the tape extends between the hubs along the open end of the cartridge housing. For purposes of illustration, tape is shown in wrapped relationship on hub 26 to form a tape pack 70 while the tape, or a leader connected thereto, is shown directly connected to hub 24 in FIG. 1. FIG. 3 shows the condition at the start of playback. FIG. 1 shows the condition at the start of rewind. To make the transition between the hubs, the tape extends outwardly from the tape pack 70, around a first inclined guide 72, diagonally across the open end of the cartridge housing (FIG. 2) to a second inclined guide 74, and thence to hub 24. Cartridge 10 is of the type for use with a tape transport unit having a number of rotatable heads or transducers for scanning the tape during a record or playback operation. Thus, the tape must be moved out of the cartridge and along an arcuate portion of the path of travel of the rotating heads. To do this, a pair of tape guides (not shown) forming parts of the tape transport unit, are received within a pair of recesses 76 and 78 when the cartridge is mounted in an operative position on the tape transport unit. The recesses 78 and 76 are cut out of the wall 16. The guides are carried by movable arm means (not shown) which causes the guides to shift in a direction laterally of the cartridge 10 so that the diagonal stretch 80 of the tape can be pulled outwardly of the cartridge and adjacent to the arcuate path of the rotatable heads.

In use, cartridge 10 is placed on a tape transport unit of the type described with the latter having some means for positioning the cartridge so that bore 66 will be in axial alignment with shaft 42. Gear 40 and shaft 42 may be sufficiently retracted in the tape transport unit so as not to enter hub 24 when the cartridge is put into its operative position. In that case, gear 40 is initially in disengaged position. In the alternative, the shaft 42 could project out of the transport unit just enough to partially enter extension 30 of hub 24 when the cartridge is placed on the transport unit. That is, gear 40 could engage the splined inner surface formed in hub 24. This would cause coupling between drive member 40 and the splined inner surface of extension 30 and would allow immediate rotation of hub 24 for a record or playback operation when shaft 42 begins to rotate. If the shaft is initially retracted, the power device and control means (not shown) on the transport unit is designed to move the shaft one-step axially and into passage 66 where drive member 40 will become engaged with the splined inner surface of extension 30 for rotating hub 24 in a counterclockwise direction to cause tape to be wound thereon and unwound from hub 26. This operative condition will correspond to a playback operation assuming that tape stretch 80 will have previously been pulled outwardly of the cartridge and disposed partially about the arcuate path of travel of the rotatable heads of the transport unit. The power device and control means will be designed to move the shaft between the record and playback position with drive member 40 coupled to extension 30 and the rewind position with drive member 40 coupled to extension 46. That is to say the shaft is moved only one step into rewind position, when the construction is such that gear 42 and extension 30 engage when the cartridge is placed in operative position. But the shaft 42 is moved one step into record-playback position and a second step into rewind position, with the gear 40 coupled to hub 26, when the retracted shaft structure is provided.

During a record or playback operation, the tape pack on hub 24 will increase in size while the tape pack 70 on hub 26 will decrease in size. Following this operation, it will then be necessary to rewind the tape onto hub 26. This will generally be done with tape stretch 80 retracted into the cartridge, whereupon shaft 42 will be moved axially so that drive member 40 is received within the splined portion of recess 64. The shaft is again rotated (counterclockwise as shown in FIG. 3), preferably at a speed higher than that for playback, to cause the tape to be unwound from hub 24 and to be wound onto hub 26, hub 26 being driven counterclockwise.

By virtue of the construction of cartridge 10 and because of the arrangement of the hubs, shaft 42 can rotate in the same direction for both record-playback and rewind operations. This is possible by attaching the tape to hub 24 in the manner shown in FIG. 1 and by rotating the hub in the direction of arrow 82 (FIG. 1) during playback. During rewind, the shaft is rotated in the same direction to wrap the tape back onto hub 26. Thus, a reversible motor is not needed with shaft 42.

Figures 4, 5, 6, 6A, 7:
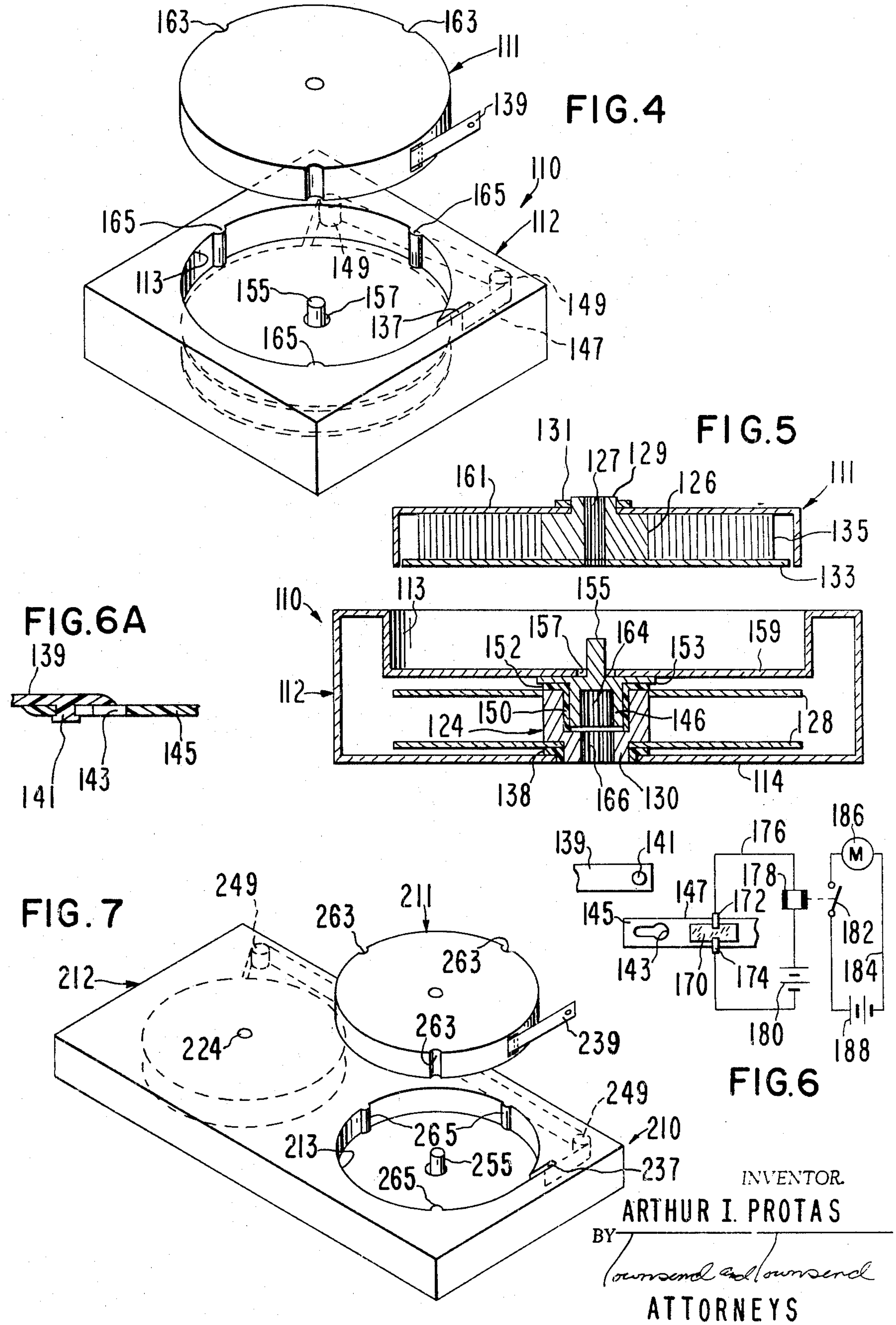
FIG. 4 is a perspective view of another embodiment of a reel-over-reel cartridge having a removable reel.
FIG. 5 is a cross-sectional view of the cartridge and the removable reel of FIG. 4.
FIG. 6 is an enlarged, fragmentary, partially schematic view of a pair of tape ends which are adapted to be interconnected when the removable reel is inserted in the cartridge.
FIG. 6a is an end elevational view of the interconnected tape ends of FIG. 6.
FIG. 7 is a perspective view of an embodiment of a reel-beside-reel cartridge having a removable reel.

Another embodiment of the cartridge of the invention is shown in FIGS. 4 and 5 and is broadly denoted by the numeral 110. This cartridge is similar in construction to cartridge 10 except that it has a removable reel 111 which is received within a well 113 in housing 112 of the cartridge. When reel 111 is in the cartridge, the latter forms a reel-over-reel type as shown in FIG. 5. The cartridge also has a lead-out slit for permitting a stretch of tape to be pulled out of the cartridge and moved adjacent to and along the arcuate path of travel of rotatable heads of a tape transport unit.

The interior of cartridge 110 is shown in FIG. 5 and includes a first hub 124 having an extension 130 supported by a flanged, anti-friction bushing 138 on an outer wall member 114 for rotation about the axis of the hub relative to housing 112. Hub 124 has a pair of flanges 128 between which a tape pack can be formed as tape is wound onto the hub.

Hub 124 has a central well for receiving the cylindrical part of a flanged, anti-friction bushing 150 whose annular flange 152 is used to support an annular flange 153 on a stub shaft 155 in a manner to permit rotation of shaft 155 relative to hub 124. A tubular extension 146 on stub shaft 155 has a recess 164 in axial alignment and in communication with a passage 166 in extension 130. Thus, recess 164 and passage 166 can alternately be engaged by a drive member such as gear 40 for rotating stub shaft 155 and hub 124, respectively. The inner surface of extension 130 and the inner surface of extension 146 are splined to permit coupling with such a drive member. Stub shaft 155 projects through an opening 157 in an intermediate wall member 159 defining the inner wall of recess 113.

Reel 111 includes an outer housing 161 which is received within recess 113 and has a number of grooves 163 on its outer periphery for mating with respective ribs 165 on cartridge housing 112 and into recess 113. A handle (not shown) can be provided to facilitate the movement of reel 113 into and out of recess 113.

Reel 111 further includes a hub 126 having a central bore 127 for receiving stub shaft 155. Bore 127 is splined and shaft 155 has projections therein whereby shaft 155 makes a driving connection with hub 126 when the shaft is in bore 127.

Hub 126 has an annular extension 129 which is engaged by a fastening member 131 for rotatably mounting the hub on housing 161. Bottom plate or flange 133 is secured to the hub and is used to support the tape pack 135 which is formed on the hub when tape is wrapped thereon.

Housing 112 is provided with a slit 137 for receiving the end 139 of the tape or tape leader in reel 111. End 139 has a button-like projection 141 which is adapted to be received with a keyhole-shaped slot 143 in one end 145 of a tape leader 147 which is attached at its opposite end to hub 124.

End 139 can first be inserted into slit 137 before reel 111 is placed in recess 113. In this way, projection 141 can be manually inserted into slot 143, following which the reel can be placed in recess 113. Projection 141 is then hooked onto end 145 when the latter is moved in a direction to move the tape out of reel 111. Removal of end 139 from end 145 can be accomplished by reversing the above manual procedure. FIG. 6a shows the connection between ends 139 and 145 when the same are adjacent to each other. The tape is guided past the open end of the cartridge by a pair of tape guides 149 adjacent to this open end. Thus, the tape can be pulled out of the cartridge in the manner described above with respect to cartridge 10 when the tape is to be placed adjacent to the arcuate path of travel of rotating heads of a tape transport unit.

In use, cartridge 110 is placed in an operative position on a tape transport unit (not shown) with leader 147 extending across the open end of the cartridge. Reel 111 can then be inserted into recess 113 in such a manner that end 139 is received within slit 137 and projection 141 is received within slit 143 to interconnect ends 139 and 145. Such interconnection can be manually effected as described above.

The tape transport unit will have a shaft and gear-like drive member essentially of the same type as shaft 42 and drive member 40 of FIG. 3. The rotation of hub 124 and shaft 155 will be alternately accomplished depending upon the axial location of the drive member. For a record or playback operation, the drive member will be coupled to extension 130, within passage 166, and for a rewind operation, the drive member is coupled to extension 146 within recess 164.

When hub 124 is rotated, the tape is pulled out of reel 111, moved past the guides 149 and onto hub 124. When this occurs, the tape can be recorded or, having previously been recorded, can be put through a playback operation, assuming that the tape has first been pulled out of the cartridge housing and positioned along and adjacent to the arcuate path of travel of the rotating heads of the tape transport unit.

After tape has been fully moved out of reel 111 and onto hub 124, it will then be desirable to rewind the tape onto the reel. In this case, the shaft is moved so that its drive member shifts into recess 164, following which the shaft is rotated in the same direction as before, possibly at a higher speed, to cause stub shaft 155 to rotate hub 126 until the tape is completely unwound from hub 124 and wound onto hub 126.

To stop the rewind operation when end 145 enters slit 137, means can be provided to deenergize the power means coupled to the drive shaft for rotating the same. To illustrate this feature, leader 147 is coated with a metallic strip 170 (FIG. 6) so that a pair of contacts 172 and 174 of a circuit 176 can engage strip 170 and thereby be short-circuited. When this occurs, a relay 178 coupled to an electrical power source 180 of circuit 176 opens an electrical switch 182 of a circuit 184 having motor 186 and an electrical power source 188. The motor is coupled to the drive shaft for rotating the same and is preferably provided with suitable brake means to cause immediate stopping of the tape with end 145 in slit 137. Reel 111 can then be lifted out of recess 113. Also, end 145 of leader 147 will again be in position to receive the tape end of reel 111 or of another reel.

The removable reel concept shown in FIGS. 4, 5 and 6 can be used with a tape cartridge 210 of the reel-beside-reel type as shown in FIG. 7. In this case, a reel 211 is received within a recess 213 in the cartridge body 212 for operational connection with a stub shaft 255 mounted in any suitable manner for rotation in the housing. Shaft 255 has means for attaching the same to a rotatable drive shaft of a tape transport unit when the reel is in recess 213. Also, reel 211 has grooves 263 for mating with projections 265 in recess 213. End 239 of the tape wound on reel 211 is received within a slit 237 in the same manner and for the same reason as shown in FIG. 4 with respect to cartridge 110.

A tape leader wrapped on a hub 224 within cartridge body 212 extends outwardly from the hub and around a pair of spaced guides 249 before entering slit 237. The guides position the leader along one open end of housing 212 so that the tape can be moved out of the housing and adjacent to rotatable transducer means in the manner described above.

In the claims:

1. A tape support comprising:

a support;

a pair of tape hubs;

a single shiftable driving gear;

means mounting one of the hubs on the support for rotation about its central axis;

means mounting the other hub on said one hub for rotation about said axis independently of said one hub, each of the hubs having a shaft-receiving passage with the passages of the hubs being adjacent to and in communication with each other, there being formations within each passage for making selective direct driving connection with said driving gear as said gear is shifted.

2. A tape cartridge as set forth in claim 1, wherein said support comprises a wall member having an opening therethrough, said passages being aligned with said opening, said one hub having a tubular extension disposed within said opening for rotation relative to the wall member.

3. A tape cartridge as set forth in claim 1, wherein said one hub has a central tubular portion, the other hub having an axial extension disposed in said tubular portion and being rotatable with respect thereto.

4. A tape cartridge comprising:

a support comprising first and second wall members, a pair of tape hubs, means mounting one of the hubs on the first wall of the support for rotation about its central axis, said one hub having a central tubular portion, the other hub being tubular and having an axial extension disposed in said tubular portion so as to mount said other hub for rotation about said axis independently of said one hub, an anti-friction bearing between the extension of said other hub and the tubular portion of said one hub, and means on the second wall member and extending into said other hub for supporting said other hub at its end opposite to said extension, each of the hubs having a shaft-receiving passage with the passages of the hubs being adjacent to and in communication with each other, there being means within each passage for making driving connection with a shaft received thereby.

5. A tape cartridge as set forth in claim 4, wherein said supporting means includes a shaft, and an anti-friction bushing surrounding the shaft and disposed within the other hub.

6. A tape cartridge comprising:

a housing;

a pair of hubs;

a single shiftable driving gear;

means mounting the hubs for rotation independently of each other within the housing with the hubs being in axial alignment with each other, one of the hubs having a shaft-receiving passage therethrough and the other hub having a shaft-receiving recess aligned with the passage and communicating therewith, each of the hubs having formations thereon for making selective direct driving connection with said driving gear as said gear is shifted.

7. A tape cartridge as set forth in claim 6, wherein said housing has a pair of opposed wall members, said hubs being between the wall members, said one hub being rotatably mounted on one of the wall members, said other hub being rotatably mounted on the other wall member and on said one hub.

8. A tape cartridge as set forth in claim 6, wherein said housing has an open end, there being a pair of spaced guides adjacent to said open end for positioning a stretch of magnetic tape along the same.

9. A tape cartridge comprising:

a housing, a pair of hubs, means mounting the hubs for rotation independently of each other within the housing with the hubs being in axial alignment with each other, one of the hubs having a shaft-receiving passage therethrough and the other hub having a shaft-receiving recess aligned with the passage and communicating therewith, and a shaft adapted to be mounted for reciprocation with respect to said passage and said recess and being rotatable in one direction, said shaft having a drive member provided with projections thereon, the inner surface of each of said hubs being provided with a set of splines, said drive member being selectively movable into coupled driving relationship with said sets of splines.

10. A tape cartridge comprising:

a support;

a first tape reel fixedly mounted on the support for rotation with respect thereto, said first reel having a first tape portion secured thereto and adapted to be wrapped thereon;

a second reel removably mounted on the same support for rotation with respect thereto, said second reel having a second tape portion secured thereto and adapted to be wrapped thereon, there being means on the support for positioning the outer ends of said tape portions in proximity to each other, said outer ends of the tape portions having means thereon for interconnecting the same when said outer ends are in proximity to each other; and guide means for positioning a stretch of tape extending between the reels adjacent to and along one side of the support.

11. A tape cartridge as set forth in claim 10, wherein said support includes a housing having a wall member provided with a recess for receiving the removable reel, there being a slit in the wall member in communication with the recess for receiving the tape of the removable reel, the portion of the wall member forming said slit defining said positioning means.

12. A tape cartridge as set forth in claim 10, wherein is provided means for sensing the position of one of said tape portions to thereby provide a signal for stopping the movement of the tape after it has reached a predetermined position.

13. A tape cartridge as set forth in claim 10, wherein said support includes a housing having a wall member provided with a slit therein for receiving the end of the tape of the removable reel, the portion of said wall member having said slit defining said positioning means.

14. A tape cartridge as set forth in claim 10, wherein said interconnecting means includes a lateral projection on the end of one of said tape portions, the end of the other tape portion having a slot for removably receiving said projection when the tape portions are in overlapping relation to each other.

15. A tape cartridge as set forth in claim 10, wherein is provided guide means on said support and said removable reel for guiding the latter into an operative position thereon.

16. In a tape cartridge the combination of:

means for providing a first journal;

a first reel having a first hub formed externally at one end to provide a first bearing rotatable in said first journal and at the other end to provide a second journal;

a second reel having a second hub formed externally at one end to provide a second bearing rotatable in said second journal;

both of said hubs being formed internally with drive engaging surfaces; and a single gear for selectively engaging said surfaces.

17. The combination of a first rotatably mounted reel including a hub formed externally to provide a journal; a bearing member rotatably mounted in said journal and including a locking projection; and a second reel including a hub formed internally with surfaces complementary to said locking projection, said bearing and said first hub being formed internally with driving surfaces adapted to be selectively engaged by drive means.

18. A tape cartridge comprising:

a support, a first tape reel fixedly mounted on the support for rotation with respect thereto;

said first reel having a first tape portion secured thereto and adapted to be wrapped thereon, a second reel removably mounted on the support for rotation with respect thereto, said second reel being in axial alignment with the first reel, said second reel having a second tape portion secured thereto and adapted to be wrapped thereon, there being means on the support for positioning the outer ends of said tape portions in proximity to each other, said outer ends of the tape portions having means thereon for interconnecting the same when said outer ends are in proximity to each other, and guide means for positioning a stretch of tape extending between the reels adjacent thereto and along one side of the support.

19. A tape cartridge comprising:

a support, a pair of tape hubs, means fixedly mounting one of the hubs for rotation relative to said support, means on said support for removably mounting the other hub thereon for rotation relative thereto, said hubs being in axial alignment with each other when said other hub is mounted on said support, and means carried by said support for guiding a stretch of tape extending between the hubs along margin of the support.

20. A tape cartridge as set forth in claim 19, wherein said mounting means for said other hub includes a housing, said other hub being rotatably coupled to said housing, and means on the support for positioning the housing in a fixed location thereon.

21. A tape cartridge as set forth in claim 19, wherein said positioning means includes structure on said support for defining a recess for complementally receiving said housing.

* * * * *